United States Patent
Quinn et al.

(10) Patent No.: US 7,350,712 B2
(45) Date of Patent: Apr. 1, 2008

(54) IMAGE SENSOR MODULE ARCHITECTURE

(75) Inventors: Kraig A. Quinn, Webster, NY (US);
Douglas E. Proctor, Rochester, NY (US); Robert Herloski, Webster, NY (US); John C. Juhasz, Fairport, NY (US); Charles J. Urso, Jr., Webster, NY (US); Frederick O. Hayes, III, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/096,020

(22) Filed: Mar. 31, 2005

(65) Prior Publication Data

US 2006/0219790 A1    Oct. 5, 2006

(51) Int. Cl.
*G06K 7/10* (2006.01)
(52) U.S. Cl. .............................. 235/462.42
(58) Field of Classification Search ..............................
235/462.01–462.49, 454
See application file for complete search history.

(56) References Cited

U.S. PATENT DOCUMENTS

| | | | | |
|---|---|---|---|---|
| 4,647,766 A | * | 3/1987 | Dimur et al. | 250/227.11 |
| 4,887,154 A | * | 12/1989 | Wawro et al. | 348/68 |
| 4,963,933 A | * | 10/1990 | Brownlee | 399/186 |
| 5,034,619 A | * | 7/1991 | Hammond, Jr. | 250/569 |
| 5,117,097 A | * | 5/1992 | Kimura et al. | 235/439 |
| 5,153,750 A | | 10/1992 | Hiroi et al. | |
| 5,291,028 A | * | 3/1994 | Droge et al. | 250/568 |
| 5,526,141 A | | 6/1996 | Ogura et al. | |
| 5,756,981 A | * | 5/1998 | Roustaei et al. | 235/462.42 |
| 5,982,512 A | | 11/1999 | Kim | |
| 6,015,200 A | | 1/2000 | Ogura | |
| 6,119,939 A | * | 9/2000 | Schwartz et al. | 235/462.01 |
| 6,417,508 B1 | | 7/2002 | Ogura et al. | |
| 6,469,808 B1 | | 10/2002 | Onishi et al. | |
| 6,476,369 B1 | | 11/2002 | Matsumoto | |

OTHER PUBLICATIONS

U.S. Appl. No. 10/995,462, filed Nov. 23, 2004.

* cited by examiner

*Primary Examiner*—Jamara A. Franklin
(74) *Attorney, Agent, or Firm*—Pillsbury Winthrop Shaw Pittman LLP

(57) ABSTRACT

Image sensor module architecture provides flexible mounting of illuminators in an imaging apparatus with flexible fasteners. The architecture involves one or more LED-based illuminators that may be mounted adjustably to provide high intensity and uniform profile luminescence. The supporting imaging and electronic circuit components are quickly assembled and disassembled from the image sensor module by using a flexible multi-function clip having multiple segments for holding multiple objects together.

9 Claims, 4 Drawing Sheets

IMAGE SENSOR MODULE ARCHITECTURE

BACKGROUND

All references cited in this specification, and their references, are incorporated by reference herein where appropriate for teachings of additional or alternative details, features and/or technical background.

Disclosed is image sensor module architecture related to imaging devices in general and to compact scanners in particular.

Known image sensor module architectures have limitations, such as large dimensions, not being able to accommodate higher intensity document illuminators and excessive assembly and disassembly times. These aspects can be overcome through architectural alterations which are described herein.

FIG. 1a illustrates a cross section of a typical common image sensing module 20 positioned underneath a glass platen 10 of a scanner. Image sensing module 20 includes a light source 45, optical system 33 and an image sensor (not shown) on circuit board 80. A document handler 15 feeds a document 5 over the platen. As the document passes over image sensing module 20, the document is illuminated by light source 45, through aperture 35 guided by illuminator 40. Illuminators 40 are housed in housing 50. The light reflected by document 5 is then focused through optical path 30 by optical lens system 33 onto image sensors. Image sensors, such as charge coupled devices (CCDs), typically have a row or linear array of photosensors with suitable supporting circuitry integrated onto a circuit board 80. When the document moves past the linear array, each of the photosensors converts reflected light from the original image into electrical signals, which in turn can be converted into digital data.

A perspective view of the image sensing module 20 is also shown in FIG. 1b with similar numerals referring to similar parts of FIG. 1a. As is seen in both Figures, circuit board 80 is mounted onto the body 60 of module 20 by means of fasteners, such as screws 90. The circuit board is offset from the body of the module with standoffs by an amount to accommodate other components, such as a connector in the middle, thus increasing the overall height h of the module. Furthermore, the overall width, w, of the module is governed by the width of the individual low-profile illuminators 40. It is often difficult to make the illuminators laterally short enough to fit within the limited space of compact scanners having a short focal distance along the optical path 30. In addition, it is known that the present image sensor modules are configured to be positioned at a fixed position for a specified platen glass thickness, t, as shown in FIG. 1a.

In order to satisfy the needs for even more compact and more powerful scanners, it is desirable to reduce the over-all dimensions of the image sensor modules while at the same time providing even larger illuminators for enhanced luminescence in scanning a document. It is also desirable to allow for the illuminators to be fully adjustable for optimum performance for any platen glass thickness, or for no glass at all. Further, improved fasteners for quick assembly and disassembly of the circuit board and supporting electronics boards would also improve the overall architecture of the image sensor module system.

SUMMARY

Aspects disclosed herein include an illuminator assembly comprising at least one angled illuminator and one angled reflector, or only one illuminator, each of the illuminators being operatively held to the assembly so as to be vertically adjustable with respect to its angled position;

an image sensor assembly having a body configured to accept one or more angled illuminators; an optical system having an optical path arranged between the illuminators to receive cooperatively light rays reflected from an object illuminated by the one or more angled illuminators; an imaging board capable of converting the light rays into electrical signals; a processing board capable of converting the electrical signals into an electronic image; and a multi-function clip configured to secure the imaging board and the processing board to the body comprising the image sensor assembly; and a device comprising a flexible body having a top surface, a bottom surface and a back surface; the top surface having a top front end and a top back end; the bottom surface having a bottom front end and a bottom back end; a top lever partially cleaved from the top surface, the top lever having a bent portion forming the top back end and extending beyond the back surface; a bottom lever partially cleaved from the bottom surface, the bottom lever having a bent portion forming the bottom back end and extending beyond the back surface; the back surface formed to comprise one or more legs connecting the top surface to the bottom surface; wherein the device is configured to form a multi-function clip to snap on to multiple objects with multiple protrusions formed on the top surface, the bottom surface and the back surface.

BRIEF DESCRIPTION OF DRAWINGS

FIG. 1b is a perspective drawing of the image sensor module shown in FIG. 1a;

DETAILED DESCRIPTION

In embodiments there is illustrated architecture for a compact, cost effective image sensor module used in imaging devices. The disclosed architecture comprises a member having a light-receiving element defining a main plane, and a light guide defining a main surface, the plane and the surface being disposed at an angle of about 30 degrees to about 90 degrees, or about 45 degrees to about 90 degrees.

In one embodiment there is disclosed an illuminator assembly comprising one angled illuminator, or tow angled illuminators, or one angled illuminator and one angled reflector, at least one angled illuminator and one angled reflector, each of illuminators or reflector being operatively held to the assembly so as to be vertically adjustable with respect to its angled position. The disclosed non-planar configuration circumvents the problem of not being able to fit an image sensor module in compact scanners that require short focal distance within available height restrictions, as explained further below. Unlike known architectures, the present architecture provides adjustable positioning of the image sensor module with respect to a transparent platen, independently of the thickness of the glass. The architecture also incorporates simplified flexible fasteners for holding the image sensor module against circuit boards, thus enabling a compact and versatile module.

Figure 2A:
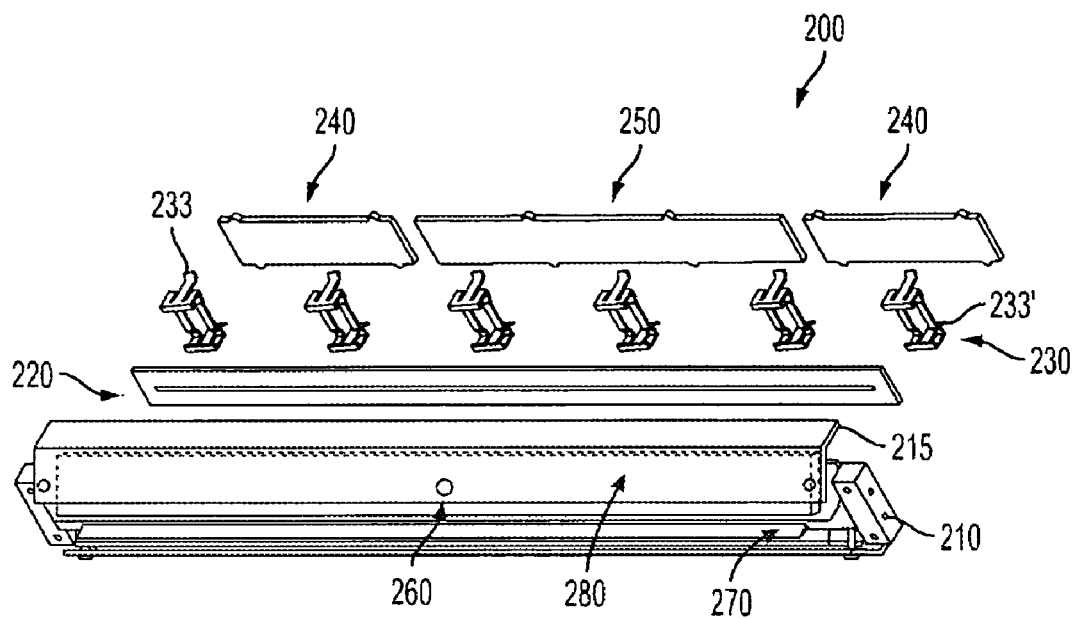
FIG. 2a is a drawing of an embodiment showing a perspective view of an image sensor module with an exploded view of the components that comprise the image sensor module, including the disclosed multi-function clips.

FIG. 2a shows a perspective view of an image sensor module 200 having a body 210 configured to hold an illuminator 270, an image sensor board 220 and various electronic boards with the aid of a multi-function clip 230. The electronic boards comprise a video processing board 250 and light source driver boards 240 shown in FIG. 2a. Although not limited to any particular configuration, the multi-function clip 230 shown in FIG. 2a is operative to hold both the image sensor board 220 and the electronic boards with two-sided outside levers 233 and inside claws 235 (see FIG. 4). The outside levers are configured to snap over the edges of the respective electronic boards, while the inside claws snap over the image sensor board 220.

Light source 260 is positioned, though not limited to, at a central portion of the image sensor module 220. The light source comprises, though not limited to, a side emitting LED, which may be an integral part of an illuminator 270 better seen in FIG. 2b. A heat sink 290 provides a means for dissipating heat from the light source. As described in more detail in the related application Ser. No. 10/995,462, an illuminator 270 may be an LED-based illuminator formed with one or more optical notches (not shown) and totally encased in a white surround 280 to yield total internal reflection of the light rays emanating from an illuminator 270. The reflected light rays are collected at an aperture 275 which in turn transmits high power and highly uniform illumination profile to illuminate a document (not shown) on platen 300.

Figure 2B:
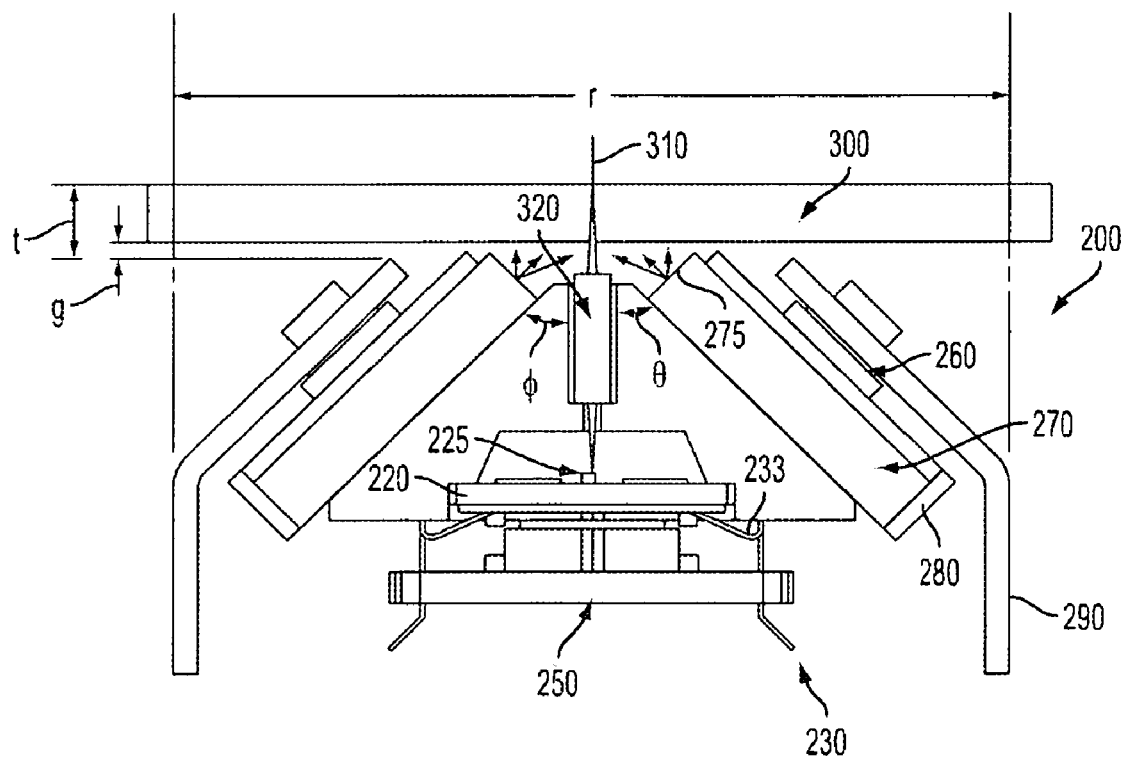
FIG. 2b is a cross sectional drawing of the image sensor module of FIG. 2a showing an angled architectural aspect of the placement of illuminators in relation to a platen and electronic components that are held in position by means of a flexible multi-function clip.

FIG. 2b shows a cross sectional view of the image sensor module disclosed in FIG. 2a. Image sensor module 200 is positioned below a platen 300. In one aspect of the embodiment disclosed in FIG. 2b, the illuminator assembly comprises one or more illuminators 270 operatively angled with respect to each other. In one embodiment, each of the illuminators may operatively be vertically adjusted with respect to its angled position to attain a gap g in relation to the platen as seen in FIG. 2b.

In another aspect, a representative flexible clip 230 holds the image sensor board 220 with one set of claws 233 facing the platen 300 and the electronic support boards with another set of levers 235 facing away from the platen.

It will be understood from the aspects of the embodiments disclosed herein that the angled architecture of one or more illuminators provide the flexibility of accommodating larger illuminators with more light intensity and more uniform luminosity than what is presently available. It will be appreciated that a horizontally positioned illuminator serving platen 300, for example, can be only as large as, and not larger than the active region r of the platen shown in FIG. 2b. That region r would not be able to accommodate two horizontal illuminators (with chamfered apertures directed at the platen) of their size. However, by positioning them at angles Φ and θ from about 45 to about 60 degrees measured from the optical path 310 shown in FIG. 2b, two illuminators can be readily harnessed to enhance the illumination of a document (not shown) on platen 300. Angles Φ and θ can be independently varied from about 45 to about 90 degrees in order to customize the luminosity desired at the platen. It will be noted that an angle of 90 degrees would approximate a horizontal position, while an angle of 0 degrees would approximate a vertical position. While a horizontal position would accommodate one illuminator for the most compact dimension r, a bundle of illuminators can be positioned with their apertures 275 facing upwards. It is also possible that an illuminator may be a passive reflector reflecting light rays from an adjacent LED illuminator to a document placed on a platen, for example.

In operation, the light reflected by the document illuminated on the platen is focused through optical path 310 by optical lens system 320, such as rod lens array, onto image sensors 225 which may comprise charge coupled devices (CCDs) arranged in rows or linear arrays on the video processing board 250. When the document moves past the linear array, each of the photosensors converts reflected light from the original image into electrical signals, which in turn can be converted into digital data. For enhanced focusing conditions, the focusing distance along the optical path 310 may be adjusted by adjusting the gap g between the platen and the image sensor module as shown in FIG. 2b.

Figure 3A:
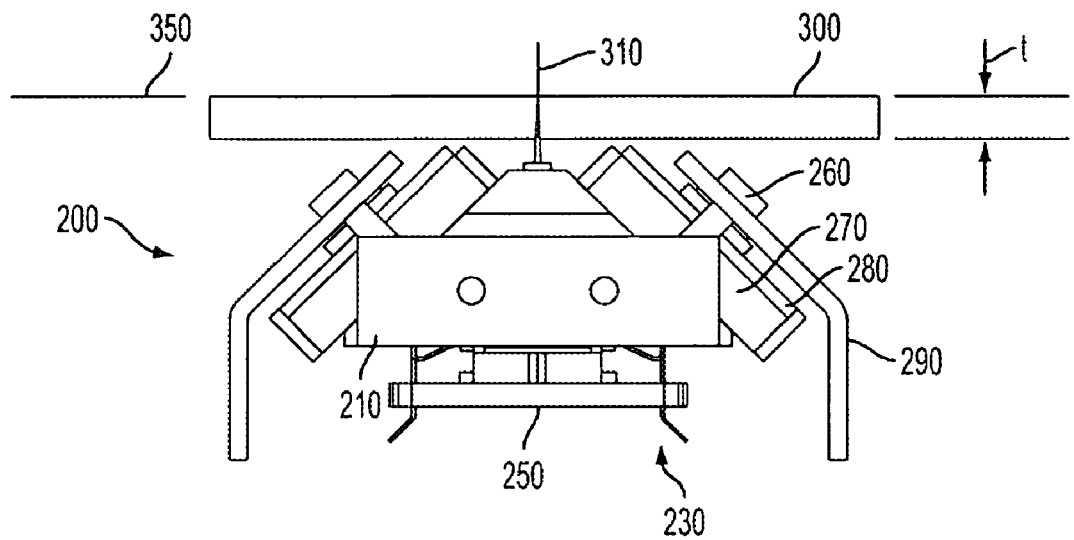
FIGS. 3a and 3b are drawings of an embodiment showing the flexibility in adjusting the focal distance between the angled illuminators and the platen for different thicknesses of the platen without having to modify the image sensor module.
Figure 3B:
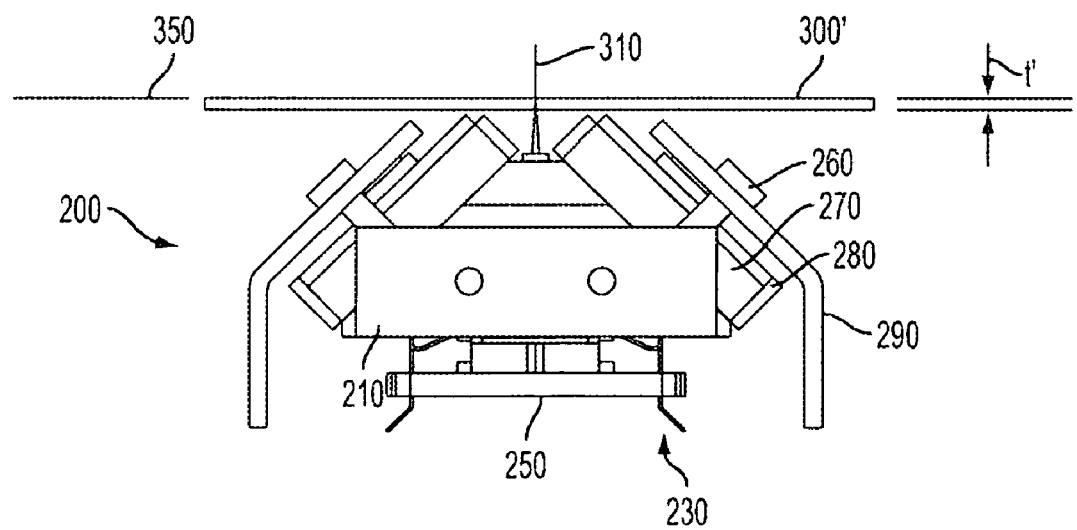

It is common practice to incorporate document illuminators into image sensor modules in a fixed position. FIGS. 3a and 3b disclose an aspect which allows flexible positioning of the illuminator(s) to yield maximum light intensity for platen glasses of different thicknesses. For example, in FIG. 3a, the upper surface of platen 300 is positioned at a datum plane 350. Platen 300 has a. thickness t which is different from platen 300' having a thickness t' shown in FIG. 3b. In order to attain optimal luminosity, illuminators 270 may be repositioned for an optimal focus distance without having to disassemble the image sensor module 200. The positioning is accomplished by mounting the illuminators slidably on to member 290, which serves the function of both a heat sink and a holding structure. Member 290 may be angled as shown in FIG. 2b to conform to the structural architecture of the image sensor module, and may comprise aluminum or any other material with high thermal conductivity.

Figure 4:
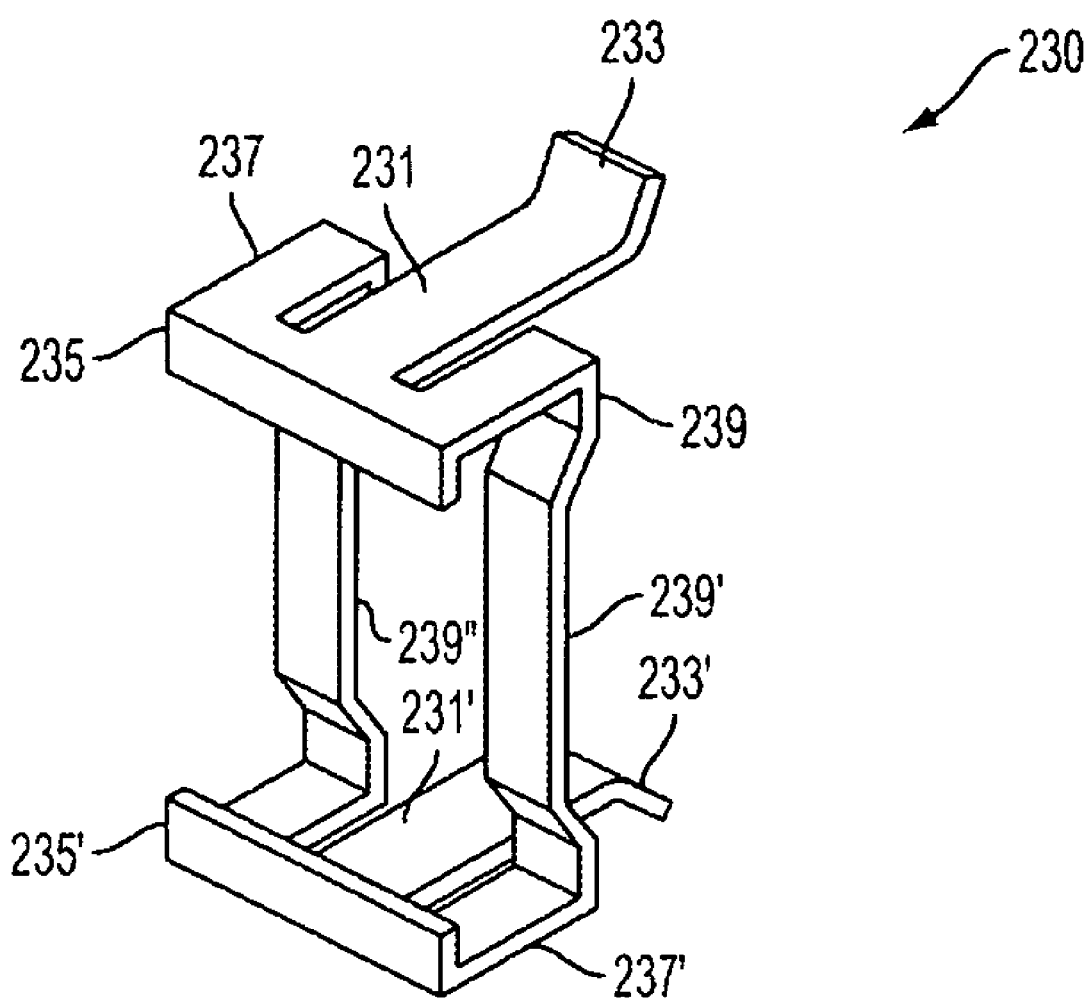
FIG. 4 is a drawing of another embodiment showing the various segments of a multi-function clip that is capable of holding multiple components of an image sensor module.

In an aspect shown in FIG. 4, the assembly of the components of the disclosed image sensor shown in FIG. 3a is accomplished by actuating finger operable levers 233 and 233' of the double-sided multi-function clip 230 having multiple snappable protrusions. That is, by pressing together the levers 233 and 233', forming a first set of protrusions, jaws 235 and 235', forming a second set of protrusions, open up to accept and firmly snap onto the edges of the image sensor board 220 shown in FIG. 2a. Although not limited to any particular configuration, the multi-function clip 230 shown in FIG. 2a is operative to hold both the image sensor board 220 and the electronic boards with two-sided outside levers 233 and inside claws 235 (see FIG. 4). The outside levers are configured to snap over the edges of the respective electronic boards, while the inside claws snap over the image sensor board 220. The assembly comprising one or more of the clips 230 now secured to the back of the image sensor board 220 may be engaged to a rail (not shown) under the lip 215 of body shown in FIG. 2a. The flexible spring leaves 231 and 231' that connect jaws 235 and 235' to protrusions 233 and 233' flex under lip 215 to hold the multi-function clip 230 snapped to the body of the multi-function clip 230. The other components such as the LED driver boards 240 and the video processing board 250 are secured from the rear of the clip by urging the components to slide in between the levers 233 and 233'. Accordingly, components including the image sensor board 220, the light source driver boards 240 and the video processing board 250 are secured onto the body 210 of the image sensor module 200 by means of a single double-sided flexible clip 230. The flexible clip may comprise a suitable springy material such as steel or plastic.

In more detail, the multi-function clip disclosed in FIG. 4 comprises a flexible body having a top surface 237, a bottom surface 237' and a back surface 239. The top surface has a top front end 235 and a top back end 233 while the bottom surface has a bottom front end 235' and a bottom back end 233'. A top lever 231 is partially cleaved from the top surface. The top lever has a bent portion forming the top back end 233 and extending beyond the back surface 239. Similarly, a bottom lever 231' is partially cleaved from the bottom surface 237'. The bottom lever has a bent portion forming the bottom back end 233' and extending beyond the back surface 239. The top and bottom levers 231 and 231' are cambered upwards and downwards, respectively, to provide springy snap action when engaged with an object surrounding the two levers. At the same time, the top and bottom bent portions 233 and 233', which are oriented upwardly and downwardly, respectively, provide a finger squeeze action to open up the two front jaws 235 and 235' for engaging an object presented at the front end of the multi-function clip. The upper 235 and lower 235' jaws are oriented downwardly and upwardly, respectively.

Further, the back surface 239 is formed to have an opening in the middle to form a pair of legs 239' and 239" connecting the top surface 237 to the bottom surface 237", as shown in FIG. 4. The pair of legs is cambered inwards towards said upper and lower jaws to provide a spring body. It will be understood that there could be multiple number of legs cambered inwards or backwards to the front of the clip, and the orientation of the camber may be alternated between successive legs.

Figure 1A:
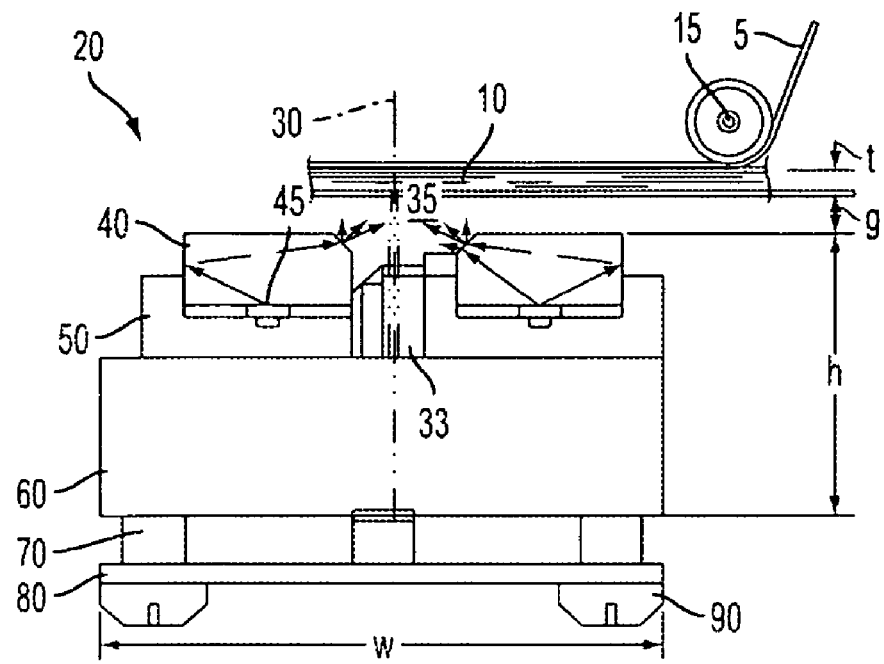
FIG. 1a is a drawing showing a cross sectional view of an arrangement of document illuminators in an image sensor module used in scanners.
Figure 1B:
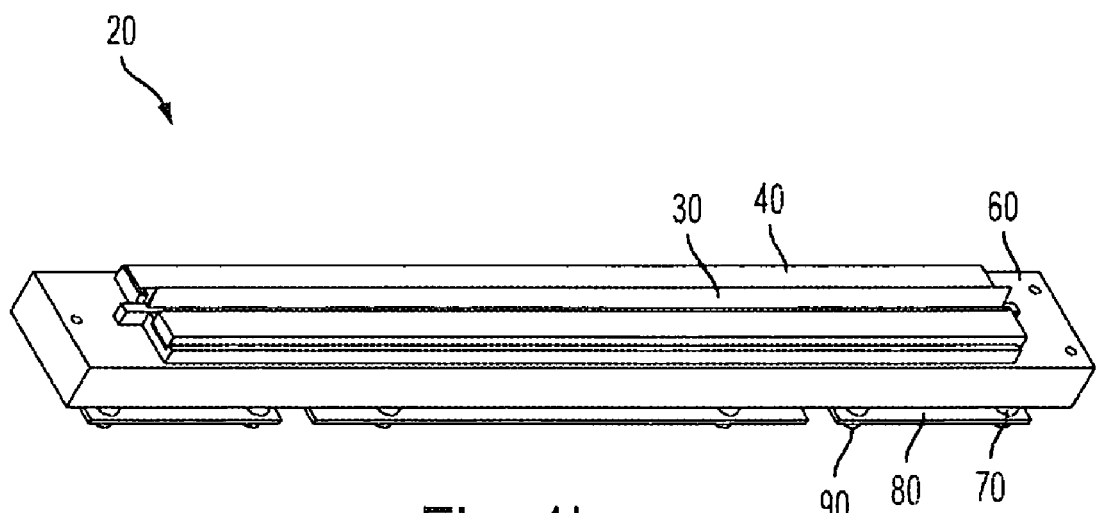

It will be appreciated by workers in the field that the quick assembly so described above also allows quick disassembly, in contrast to procedures involving stand-offs and screws that are commonly used with image sensor modules such as shown in FIG. 1b. The disassembly is accomplished in reverse order by removing the multi-function clip 230 and board assembly from the body 210 of the image sensor module 200, releasing the image sensor board 220 from the front jaws 235 of the clip and then sliding off the video processor board and driver boards from the rear finger actuated levers 233 and 233' shown in FIG. 4. It will be understood that the disclosed flexible clip is not limited to that which is shown in FIG. 4.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. An apparatus comprising:
   at least one pair of illuminators;
   an image sensor assembly having a body with at least two planar heat sinks angled with respect to one another;
   at least one attachment device configured to slidably attach the illuminators to the planar heat sinks of the image sensor assembly body to form angled illuminators;
   an optical system, having an optical path arranged between the angled illuminators, and configured to receive light rays reflected from an object illuminated by the angled illuminators and convert the received light rays into electrical signals representative of an image of the object; and
   a board configured to convert the electrical signals into an electronic image, wherein the angled illuminators are positioned between each entire respective planar heat sink and the optical system.

2. An apparatus in accordance with claim 1, wherein said angled illuminators are angled with respect to each other at an angle from about 45 degrees to about 90 degrees from said optical path.

3. An apparatus in accordance with claim 1, wherein said angled illuminators comprise an LED-based illuminator.

4. An apparatus in accordance with claim 3, wherein said LED-based illuminator comprises a side-emitting LED.

5. An apparatus in accordance with claim 3, wherein said LED-based illuminator is encased in a white surround environment.

6. An apparatus in accordance with claim 1, wherein said angled illuminators is associated with a reflector.

7. An apparatus in accordance with claim 1, wherein said optical system comprises one or more photosensors.

8. An apparatus in accordance with claim 7, wherein said photosensors comprise charge coupled devices (CCDs).

9. An apparatus in accordance with claim 1, wherein said optical system comprises linear array sensors.

* * * * *